United States Patent
Olsson et al.

(10) Patent No.: US 6,625,112 B1
(45) Date of Patent: Sep. 23, 2003

(54) SYNCHRONIZATION

(75) Inventors: Lennart Olsson, Lulea (SE); Gunnar Bahlenberg, Lulea (SE); Daniel Bengtsson, Lulea (SE); Siwert Hakansson, Jarfalla (SE); Anders Isaksson, Lulea (SE); Lars-Ake Isaksson, Lulea (SE); Mikael Isaksson, Lulea (SE); Magnus Johansson, Lulea (SE); Mauritz Lahti, Lulea (SE); Lis-Marie Ljunggren, Lulea (SE); Hans Lundberg, Lulea (SE); Tomas Nordstrom, Lulea (SE); Sven-Rune Olofsson, Lulea (SE); Tomas Stefansson, Boden (SE); Hans Ohman, Lulea (SE); Goran Okvist, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/147,229

(22) PCT Filed: Feb. 27, 1998

(86) PCT No.: PCT/SE98/00354

§ 371 (c)(1),
(2), (4) Date: Mar. 11, 1999

(87) PCT Pub. No.: WO98/39886

PCT Pub. Date: Sep. 11, 1998

(30) Foreign Application Priority Data

Mar. 3, 1997 (SE) ................................. 9700785
Oct. 6, 1997 (SE) ................................. 9703630

(51) Int. Cl.[7] .............................. H04J 11/00; H04J 3/07
(52) U.S. Cl. ...................................... 370/206; 370/503
(58) Field of Search ................................ 370/203, 204, 370/206, 207, 208, 210, 503, 509, 511, 512, 514; 375/260, 355, 364, 365, 368

(56) References Cited

U.S. PATENT DOCUMENTS

| | | | | | |
|---|---|---|---|---|---|
| 5,371,548 A | * | 12/1994 | Williams | ..................... | 348/473 |
| 5,444,697 A | | 8/1995 | Leung et al. | | |
| 5,537,398 A | * | 7/1996 | Siwiak | ..................... | 370/204 |
| 5,732,113 A | * | 3/1998 | Schmidl et al. | ............ | 375/354 |
| 5,790,514 A | * | 8/1998 | Marchok et al. | ........... | 370/208 |
| 5,796,785 A | * | 8/1998 | Spiero | ........................ | 375/316 |
| 5,802,117 A | * | 9/1998 | Ghosh | ........................ | 375/344 |
| 5,815,488 A | * | 9/1998 | Williams et al. | ........... | 370/206 |
| 5,848,107 A | * | 12/1998 | Philips | ........................ | 375/342 |
| 5,914,931 A | * | 6/1999 | Kang et al. | ................. | 370/203 |
| 5,914,933 A | * | 6/1999 | Cimini et al. | ............... | 370/208 |
| 6,035,000 A | * | 3/2000 | Bingham | .................... | 370/525 |
| 6,035,003 A | * | 3/2000 | Park et al. | .................. | 370/208 |
| 6,078,592 A | * | 6/2000 | Spiero | ........................ | 370/474 |

FOREIGN PATENT DOCUMENTS

| | | |
|---|---|---|
| EP | 0 730 357 A2 | 9/1996 |
| WO | WO 95 03656 | 2/1995 |

* cited by examiner

*Primary Examiner*—Chau Nguyen
*Assistant Examiner*—Soon-Dong Hyun
(74) *Attorney, Agent, or Firm*—Lisa K. Jorgenson; Allen, Dyer, Doppelt, Milbrath & Gilchrist, P.A.

(57) ABSTRACT

A mechanism for achieving frame synchronization in the frequency domain. In order to synchronize a receiver with a transmitter, on signal acquisition, the interval in which orthogonality exists is determined. Once this has been achieved, an argument function is calculated from the received frame. This argument function can then be used to improve the synchronization. This system is particularly suitable for use in ADSL and VDSL modems which can be used to give broad band access over copper networks. It is also relevant to broad band transmission in mobile and semi-mobile systems for transmission over radio channels.

37 Claims, 2 Drawing Sheets

SYNCHRONIZATION

BACKGROUND OF THE INVENTION

1. Field of the Invention

The present invention relates to an OFDM transmission system, an OFDM receiver, OFDM modems including ADSL modems and VDSL modems, and methods of synchronising an OFDM receiver with an incoming multi-carrier signal, in particular, the present invention relates to frame synchronisation for an OFDM system using frequency domain data.

2. Background of the Invention

In this specification the term OFDM (Orthogonal Frequency Division Multiplex) type is intended to include DMT (Discrete Multi-Tone).

The demand for provision of multi-media and other broad bandwidth services over telecommunications networks has created a need to transmit high bit rate traffic over copper pairs. This requirement has led to the development of a number of different transmission schemes, such as, ADSL (Asynchronous Digital Subscriber Line) and VDSL (Very high bit-rate Digital Subscriber Lines). One of the more likely modulation systems for all these transmission schemes is a line code known as DMT (discrete multi-tone), which bears a strong resemblance to orthogonal frequency division multiplex, and is a spread spectrum transmission technique.

In discrete multi-tone transmission, the available bandwidth is divided into a plurality of sub-channels each with a small bandwidth, 4 kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Because inter pair interference in copper pair cables is higher where data is transmitted in both directions, i.e. symmetric duplex, a number of transmission schemes have proposed the use of asymmetric schemes in which high data rates are transmitted in one direction only. Such schemes meet many of the demands for high bandwidth services, such as, video-on-demand.

VDSL technology resembles ADSL to a large degree, although ADSL must cater for much larger dynamic ranges and is considerably more complex as a result. VDSL is lower in cost and lower in power, and premises VDSL units need to implement a physical layer media access control for multiplexing upstream data.

Four line codes have been proposed for VDSL:

CAP; Carrierless AM/PM, a version of suppressed carrier QAM, for passive NT configurations, CAP would use QPSK upstream and a type of TDMA for multiplexing (although CAP does not preclude an FDM approach to upstream multiplexing);

DMT; Discrete Multi-Tone, a multi-carrier system using Discrete Fourier Transforms to create and demodulate individual carriers, for passive NT configurations; DMT would use FDM for upstream multiplexing (although DMT does not preclude a TDMA multiplexing strategy);

DWMT; Discrete Wavelet Multi-Tone, a multi-carrier system using Wavelet Transforms to create and demodulate individual carriers, DWMT also uses FDM for upstream multiplexing, but also allows TDMA; and SLC; Simple Line Code, a version of four-level baseband signalling that filters the base band and restores it at the receiver, for passive NT configurations; SLC would most likely use TDMA for upstream multiplexing, although FDM is possible.

Early versions of VDSL will use frequency division multiplexing to separate downstream from upstream channels and both of them from POTS and ISDN. Echo cancellation may be required for later generation systems featuring symmetric data rates. A rather substantial distance, in frequency, will be maintained between the lowest data channel and POTS to enable very simple and cost effective POTS splitters. Normal practice would locate the downstream channel above the upstream channel. However, the DAVIC specification reverses this order to enable premises distribution of VDSL signals over coaxial cable systems.

In a multi-carrier system, such as a DMT system, a receiver must be able to recover a sampling clock that is very accurately synchronized to a transmitter sampling clock. A known method, for achieving synchronization, uses a reserved carrier, the pilot carrier, which is transmitted with a fixed phase. The receiver sampling clock is then phase locked to the pilot carrier. Frame timing must also be recovered. In existing systems this has been achieved by using a correlation technique operating in the time domain.

With OFDM systems the frequency domain data is the Fourier transform of the received time domain OFDM frames. The time domain frames must be sampled, at the receiver, in synchronism with the transmitter, so that each received frame contains data from only a single transmitted frame. It is vital for this synchronism to be maintained in order to maintain the orthogonality of the frames.

A typical multi-carrier system, of the OFDM type, which uses a cyclic prefix, permits orthogonality to be maintained when there is a small deviation from exact frame synchronisation. Because the signalling interval includes both an entire frame and the cyclic prefix, which is a repetition of part of the frame, a frame sampled within the signalling interval will contain data from only one frame. Since the signalling interval is greater than the frame period, this gives some leeway in frame alignment.

The present invention provides a mechanism for achieving frame synchronisation, in the frequency domain, by utilising this fact. The first step in synchronising a receiver with a transmitter, on signal acquisition, is to determine the interval in which orthogonality exists. Once this has been achieved an argument function is calculated from the received frame. This argument function can then be used to improve the synchronisation.

Known techniques for achieving frame synchronisation do not operate entirely in the frequency domain, as is the case for the present invention. Use of the present invention permits implementation of OFDM receivers with a considerable saving in complexity, compared with prior art receivers, because the arithmetic operations required can be performed at low resolution.

SUMMARY OF THE INVENTION

The present invention is particularly suitable for use in ADSL and VDSL modems which can be used to give broadband access over copper networks. The invention is also of relevance to broadband transmission in mobile and semi-mobile systems for transmission over the radio channels.

According to a first aspect of the present invention, there is provided a receiver, for use in an OFDM type transmission system, in which data is transmitted in frames, each frame having a cyclic prefix which is a repetition of part of said frame, characterised in that said receiver is synchronised with transmitted frames by operating on frequency domain input data.

Search means may be provided for carrying out a search for a time domain interval of one frame length which falls within a signalling interval that includes said frame and said cyclic prefix.

Said search means may include a counter means for generating a frame start pulse, said counter means' state being modified in steps which shift said frame start pulse by an amount equal to said cyclic prefix length.

Said counter means may be clocked by a sampling clock.

Said counter means may be clocked to shift the timing of said frame start pulse until an objective function has a minimum value.

Said objective function may be derived from said frequency domain input data.

Said objective function may be an estimate of a disturbance in an argument function.

Said objective function, J, for a kth frame may be calculated from:

$$J_k = \sum_n \left| L\left(\frac{X_{n,k}}{T_{n,k}}\right) - L\left(\frac{X_{n-1,k}}{T_{n-k,k}}\right) \right|$$

where X is a frequency domain vector, and T refers to training frame data and said summation is over all active carriers n.

Said search means may continue to search, until a first sample of a frame is identified, by using an estimated slope of an argument function of a frequency domain vector, X.

Said counter means' state may be modified incrementally until said slope is close to zero.

According to a second aspect of the present invention, there is provided an OFDM type transmission system in which data is transmitted in frames, each frame having a cyclic prefix which is a repetition of part of said frame, characterised in that said system includes a receiver as defined in any preceding paragraph.

According to a third aspect of the present invention, there is provided, in an OFDM type system in which data is transmitted in frames, each frame having a cyclic prefix which is a repetition of part of said frame, a method of synchronising a receiver with a transmitter so that received frames are aligned with transmitted frames, characterised by operating, in said receiver, on frequency domain input data.

Said receiver may search for a time domain interval of one frame length that falls within a signalling interval which includes said frame and said cyclic prefix.

Said searching step may be performed by incrementally modifying a counter's state, said counter generating a frame start pulse which, for each increment, is shifted by an amount equal to said cyclic prefix length.

Said counter may be clocked with a sampling clock.

Said counter may be docked to shift said frame start pulse's timing until an objective function has a minimum value.

Said objective function may be derived from said frequency domain input data.

Said objective function may be estimated from a disturbance in an argument function.

Said objective function, J, for a kth frame may be calculated from:

$$J_k = \sum_n \left| L\left(\frac{X_{n,k}}{T_{n,k}}\right) - L\left(\frac{X_{n-1,k}}{T_{n-k,k}}\right) \right|$$

where X is a frequency domain vector, and T refers to training frame data and said summation is over all active carriers n.

Said search may be continued, to identify a first sample of a frame, by using an estimated slope of an argument function of a frequency domain vector, X.

Said counter may be modified, incrementally, until said slope is close to zero.

According to a fourth aspect of the invention there is provided an ADSL modem characterised in that said modem has a receiver as defined above, or operates a method of synchronisation as defined above.

According to a fifth aspect of the present invention, there is provided a VDSL modem characterised in that said modem has a receiver as defined above, or operates a method of synchronisation as defined above.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
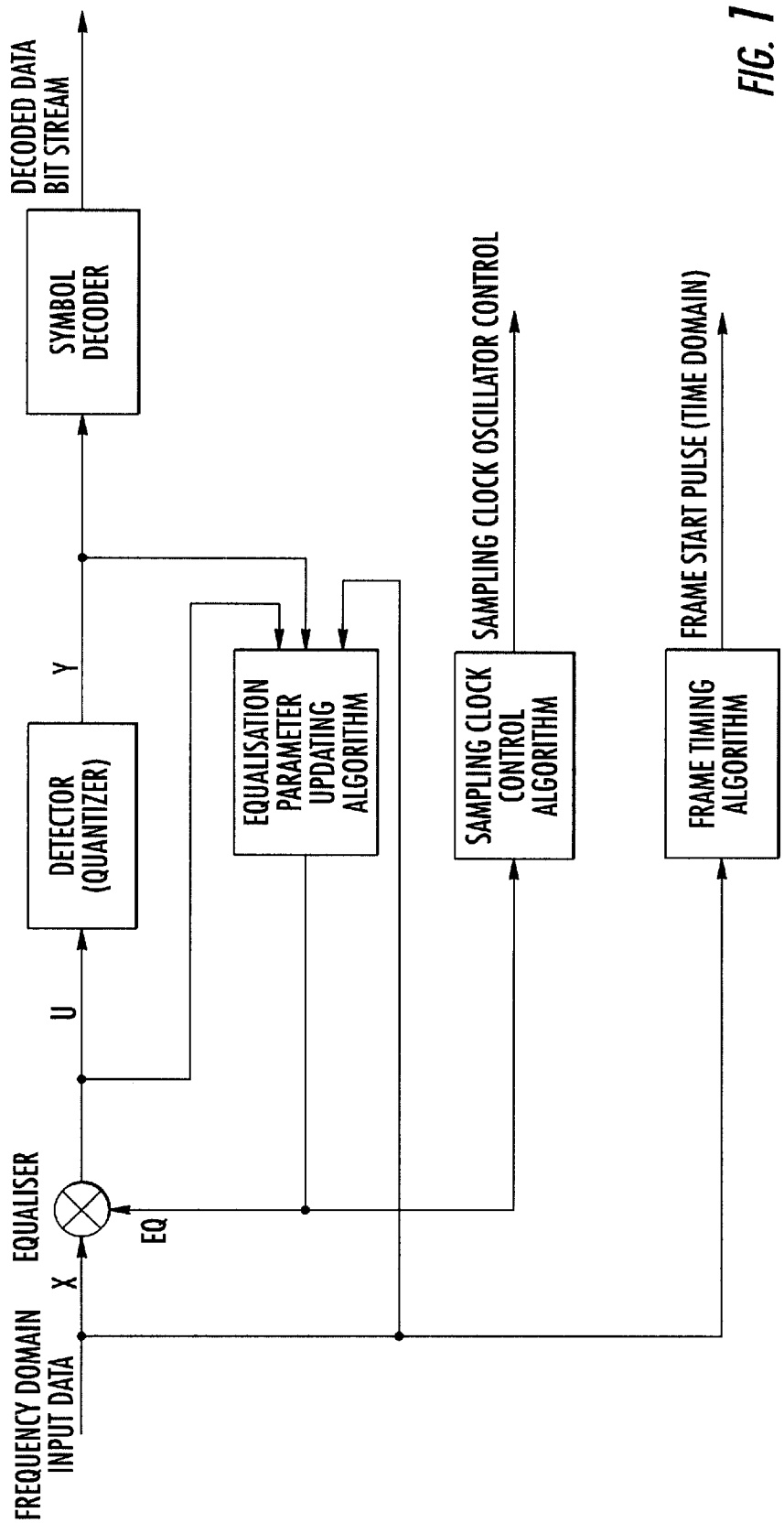
FIG. 1 illustrates, in functional form, an equaliser and sampling control unit in which the present invention can be implemented.

The synchronisation process of the present invention is illustrated in a functional form in FIG. 1. Incoming frequency domain data is passed via an equaliser to a detector/quantizer and thence to a symbol decoder. The operation of the remaining blocks shown in FIG. 1, namely the equalisation parameter updating algorithm, the sampling clock control algorithm and the frame timing algorithm are explained in the following description. It is, however, worth noting at this point that:

the equalisation parameter updating algorithm takes inputs from the raw frequency domain input data, X, the output of the equaliser, U, and the output of the detector/quantizer, Y;

the sampling clock control algorithm receives an input from the equalisation parameter updating algorithm, as does the equaliser; and the frame timing algorithm accepts an input from the raw frequency domain input data.

The frequency-domain data comprises the received time-domain OFOM frames after Fourier transformation. The time-domain frames must be sampled in synchronism with the transmitter so that each received frame contains data from only one transmitted frame. This is important in order to maintain the orthogonality of the frames.

Figure 2:
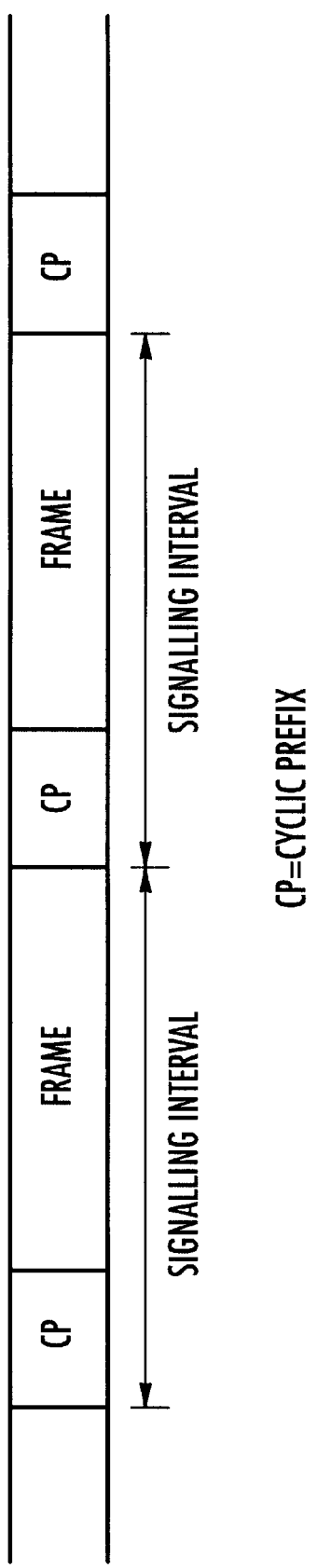
FIG. 2 illustrates the time domain data format of an OFDM signal used with the present invention.

FIG. 2 shows the time-domain format for the transmission of OFDM frames used with the present invention.

The signalling interval contains a cyclic prefix and a frame. The cyclic prefix is a copy of the last part of the frame. This means that a frame sampled anywhere inside the signalling interval will contain data from one transmitted frame only. A deviation from the exact frame timing will, therefore, lead to a cyclic permutation of the frame. The orthogonality will, however, be maintained.

The frame timing deviation can be detected as a linear slope of an argument function—see below for further details, proportional to the deviation. This will, however, only be valid for as long as the orthogonality is maintained. The cyclically permuted interval (the signalling interval) must first be found initially.

Frequency-domain synchronisation is thus based on an argument function of the received frames (X), compensated for the modulation. The argument function of a frequency domain frame is the vector of arguments of the individual complex elements (carriers).

The argument of an individual carrier, in this case, is the sum of the modulation argument, the channel influence and the sample timing deviation. The modulation argument is eliminated by subtracting the known argument value. This is done using known transmitted data (a training frame T). The channel influence is neglected in this case.

The argument of a complex number is the inverse tangent of the imaginary part divided by the real part. A problem involved in this calculation is that the inverse tangent function is periodic with a period $2\pi$ radians. In this application, it is necessary to handle arguments larger than $\pi$ radians, which is the range of the inverse tangent function. It is usually possible to use some other information about the argument to unwrap this periodic function so that it covers a larger range. A useful assumption is that the difference in argument between adjacent carriers is smaller than $\pi$ radians. It is then possible to compensate for each discontinuity, caused by the inverse tangent function periodicity, and thus unwrap the argument function.

In order to use the argument function for sample timing control, it is necessary that the sampling of the received frame always starts inside the cyclically permuted interval (the signalling interval). If this condition is not fulfilled, the argument function will be severely disturbed and will not be valid for sample timing control.

The present invention employs a new technique for finding the correct interval for frame sampling and uses an estimate of the magnitude of the disturbance of the argument function as an objective function.

A frame sampled inside the correct interval shows a minimum value for this magnitude. The frame start time is stepped through a signalling interval length and the objective function is estimated for each step. The step size is equal to the cyclic prefix size. The frame start time that gives the minimum value of the objective function is then selected.

Any measure that represents the magnitude of variations in the argument function can be used as an objective function in this technique. An example of such a measure is given by equation (1), below.

The sum of the magnitudes of the argument differences of adjacent carriers is used as the objective function, J, for selecting the correct frame interval. The divisions by the training frame, T, components, shown in the equation, are not actually performed, since only the arguments of the quotients are calculated (modulation compensation). An unwrapping function is used to take care of the occasions when argument differences of adjacent carriers are taken across the discontinuity of the inverse tangent function.

$$J_k = \sum_n \left| \angle\left(\frac{X_{n,k}}{T_{n,k}}\right) - \angle\left(\frac{X_{n-1,k}}{T_{n-k,k}}\right) \right| \quad (1)$$

The range of n in equation (1) depends on which carriers are active. In cases when the band of active carriers is divided into several parts, separated by empty bands, the objective function J is calculated, according to equation (1), with the inactive carriers omitted. It is important that both operands of the difference expression always relate to active carriers.

A minimum value of J means that the frame has been sampled inside the cyclically permuted interval (signalling interval).

The initialization of the frame synchronization is performed in the steps set out below. Initially, a training frame, modulated with known data, is transmitted repeatedly. Then the following synchronization steps are implemented:

10. A search is performed for a time-domain interval of one frame length, located inside one cyclically permuted interval (signalling interval). The frame start pulse is generated by a counter, clocked by the sampling clock, and has a period equal to the signalling interval. During the search procedure, the counter state is modified in steps equal to the cyclic prefix length until the correct interval is found, as indicated by the objective function. The frequency domain vector, X, is used as the input to the objective function estimation.

11. The search is continued for the first sample of the frame by using the estimated slope of the unwrapped frame argument function of the vector X. The state of the frame start position counter is modified in a binary search fashion (successive approximation), until the slope is close to zero. The sign of the argument slope is used to determine the direction of each change. The slope of the argument function is estimated using a standard method.

The unique novelty in the technique of the present invention is the use of the argument function's properties for detecting whether, or not, the sampled frame is orthogonal. This indicates whether, or not, the whole frame has been sampled correctly inside one signalling interval.

The present invention permits a low complexity implementation, since the arithmetic operations involved can be performed using low resolution. Especially the inverse tangent operation can be greatly simplified.

What is claimed is:

1. A receiver, for use in an OFDM transmission system, in which data is transmitted in frames, each frame having a cyclic prefix which is a repetition of part of said frame, said receiver being synchronised with transmitted frames by operating on frequency domain input data, said receiver comprising search means for carrying out a search for a time domain interval of one frame length which falls within a signalling interval that includes said frame and said cyclic prefix, said search means including a counter means for generating a frame start pulse, a state of said counter means being modified in steps which shift said frame start pulse by an amount equal to said cyclic prefix length.

2. A receiver, as claimed in claim 1, wherein said counter means is clocked by a sampling clock.

3. A receiver, as claimed in claim 1, wherein said counter means is clocked to shift the timing of said frame start pulse until an objective function has a minimum value.

4. A receiver, as claimed in claim 3, wherein said objective function is derived from said frequency domain input data.

5. A receiver, as claimed in claim 4, wherein said objective function is an estimate of a disturbance in an argument function.

6. A receiver, as claimed in claim 5, wherein said objective function, J, for a kth frame is calculated from:

$$J_K = \sum_n \left| \angle\left(\frac{X_{n,k}}{T_{n,k}}\right) - \angle\left(\frac{X_{n-1,k}}{T_{n-k,k}}\right) \right|$$

where X is a frequency domain vector, and T refers to training frame data and said summation is over all active carriers n.

7. A receiver, as claimed in claim 4, wherein said search means continues to search, until a first sample of a frame is identified, by using an estimated slope of an argument function of a frequency domain vector, X.

8. A receiver, as claimed in claim 7, wherein a state of said counter means is modified incrementally until said slope is close to zero.

9. An OFDM transmission system in which data is transmitted in frames, each frame having a cyclic prefix which is a repetition of part of said frame, said system comprising a receiver being synchronised with transmitted frames by operating on frequency domain input data, said receiver comprising search means for carrying out a search for a time domain interval of one frame length which falls within a signalling interval that includes said frame and said cyclic prefix, said search means including a counter means for generating a frame start pulse, a state of said counter means being modified in steps which shift said frame start pulse by an amount equal to said cyclic prefix length.

10. A method of synchronising a receiver with a transmitter in an OFDM system in which data is transmitted in frames, each frame having a cyclic prefix which is a repetition of part of said frame, so that received frames are aligned with transmitted frames, wherein the receiver operates on frequency domain input data, the method comprising said receiver searching for a time domain interval of one frame length that falls within a signalling interval which includes said frame and said cyclic prefix, said searching being performed by incrementally modifying a counter's state, said counter generating a frame start pulse which, for each increment, is shifted by an amount equal to said cyclic prefix length.

11. A method, as claimed in claim 10, further comprising clocking said counter with a sampling clock.

12. A method, as claimed in claim 10, further comprising clocking said counter to shift said frame start pulse's timing until an objective function has a minimum value.

13. A method, as claimed in claim 12, further comprising deriving said objective function from said frequency domain input data.

14. A method, as claimed in claim 13, further comprising estimating said objective function from a disturbance in an argument function.

15. A method, as claimed in claim 14, further comprising calculating said objective function, J, for a kth frame from:

$$J_K = \sum_n \left| \angle\left(\frac{X_{n,k}}{T_{n,k}}\right) - \angle\left(\frac{X_{n-1,k}}{T_{n-k,k}}\right) \right|$$

where X is a frequency domain vector, and T refers to training frame data and said summation is over all active carriers n.

16. A method, as claimed in claim 13, further comprising continuing said search, to identify a first sample of a frame, by using an estimated slope of an argument function of a frequency domain vector, X.

17. A method, as claimed in claim 16, further comprising modifying said counter, incrementally, until said slope is close to zero.

18. An ADSL modem comprising a receiver as claimed in claim 1.

19. A VDSL modem comprising a receiver as claimed in claim 1.

20. A receiver, for use in an OFDM transmission system in which data is transmitted in frames, each frame having a cyclic prefix which is a repetition of part of the frame, the receiver being synchronised with transmitted frames by operating on frequency domain input data, the receiver comprising a search unit to find a correct frame sampling interval by finding a minimum value of an objective function derived from the frequency domain input data, and to select a frame start time associated with the minimum value.

21. A receiver according to claim 20, wherein the search unit searches for a time domain interval of one frame length which falls within a signalling interval that includes the frame and the cyclic prefix.

22. A receiver according to claim 21, wherein the search unit includes a counter for generating a frame start pulse, a state of the counter being modified in steps which shift the frame start pulse by an amount equal to the cyclic prefix length.

23. A receiver according to claim 20 wherein said counter is clocked by a sampling clock.

24. A receiver according to claim 20 wherein said counter is clocked to shift the timing of the frame start pulse until the objective function has a minimum value.

25. A receiver according to claim 24 wherein the objective function is an estimate of a disturbance in an argument function.

26. A receiver according to claim 25 wherein the objective function, J, for a kth frame is calculated from:

$$J_K = \sum_n \left| \angle\left(\frac{X_{n,k}}{T_{n,k}}\right) - \angle\left(\frac{X_{n-1,k}}{T_{n-k,k}}\right) \right|$$

where X is a frequency domain vector, and T refers to training frame data and the summation is over all active carriers n.

27. A receiver according to claim 24 wherein the search unit continues to search, until a first sample of a frame is identified, by using an estimated slope of an argument function of a frequency domain vector, X.

28. A receiver according to claim 27 wherein a state of the counter is modified incrementally until said slope is close to zero.

29. A method of synchronising a receiver with a transmitter in an OFDM system in which data is transmitted in frames, each frame having a cyclic prefix which is a repetition of part of the frame, so that received frames are aligned with transmitted frames, wherein the receiver operates on frequency domain input data, the method comprising.

30. A method according to claim 29 wherein searching comprises searching for a time domain interval of one frame length that falls within a signalling interval which includes the frame and the cyclic prefix.

31. A method according to claim 30 wherein searching further comprises incrementally modifying a counter's state, said counter generating a frame start pulse which, for each increment, is shifted by an amount equal to said cyclic prefix length.

32. A method according to claim 31 further comprising clocking the counter with a sampling clock.

33. A method according to claim 31 further comprising clocking the counter to shift the frame start pulse's timing until an objective function has a minimum value.

34. A method according to claim 33 further comprising estimating the objective function from a disturbance in an argument function.

35. A method according to claim 34 further comprising calculating the objective function, J, for a kth frame from:

$$J_K = \sum_n \left| \angle\left(\frac{X_{n,k}}{T_{n,k}}\right) - \angle\left(\frac{X_{n-1,k}}{T_{n-k,k}}\right) \right|$$

where X is a frequency domain vector, and T refers to training frame data and the summation is over all active carriers n.

36. A method according to claim 33 further comprising continuing the search, to identify a first sample of a frame, by using an estimated slope of an argument function of a frequency domain vector, X.

37. A method according to claim 36 further comprising modifying the counter, incrementally, until the slope is close to zero.

* * * * *

UNITED STATES PATENT AND TRADEMARK OFFICE
CERTIFICATE OF CORRECTION

PATENT NO.    : 6,625,112 B1
DATED         : September 23, 2003
INVENTOR(S)   : Lennart Olsson et al.

It is certified that error appears in the above-identified patent and that said Letters Patent is hereby corrected as shown below:

Column 8,
Lines 48-49, delete "the method comprising." and insert -- the method comprising searching for a correct frame sampling interval by finding a minimum value of an objective function derived from the frequency domain input data, and selecting a frame start time associated with the minimum value. --

Signed and Sealed this

Twenty-seventh Day of January, 2004

JON W. DUDAS
*Acting Director of the United States Patent and Trademark Office*